United States Patent
Guo et al.

(10) Patent No.: US 10,482,400 B2
(45) Date of Patent: Nov. 19, 2019

(54) COGNITIVE ROUTE PLANNING FOR UNIT REPLENISHMENT IN A DISTRIBUTED NETWORK

(71) Applicant: International Business Machines Corporation, Armonk, NY (US)

(72) Inventors: Shang Qing Guo, Cortlandt Manor, NY (US); Jonathan Lenchner, North Salem, NY (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 15/416,829

(22) Filed: Jan. 26, 2017

(65) Prior Publication Data
US 2018/0211190 A1  Jul. 26, 2018

(51) Int. Cl.
*G06Q 10/04* (2012.01)
*G06Q 10/08* (2012.01)
(Continued)

(52) U.S. Cl.
CPC ..... *G06Q 10/047* (2013.01); *G06Q 10/08355* (2013.01); *G06F 17/00* (2013.01); *G06Q 10/10* (2013.01)

(58) Field of Classification Search
CPC ........ G06Q 10/00; G06Q 40/00; G06Q 10/08; G06Q 10/10; G06Q 20/20; G07D 11/00; G06F 17/00; G06F 7/00
(Continued)

(56) References Cited

U.S. PATENT DOCUMENTS

| 4,847,764 A | * | 7/1989 | Halvorson | ............ | G06F 19/326 |
| | | | | | 700/231 |
| 5,389,773 A | | 2/1995 | Coutts | | |

(Continued)

FOREIGN PATENT DOCUMENTS

| CN | 102081784 A | 6/2011 |
| JP | 06150112 A | 5/1994 |

(Continued)

OTHER PUBLICATIONS

Potter, "How Do Banks Prevent ATMs From Running Out of Money?" StockMonkeys, 2017. Last accessed Jan. 24, 2017. http://www.stockmonkeys.com/how-do-banks-prevent-atms-from-running-out-of-money-BRYHTMDA/.

(Continued)

*Primary Examiner* — Olusegun Goyea
(74) *Attorney, Agent, or Firm* — Amin, Turocy & Watson, LLP

(57) ABSTRACT

Techniques facilitating cognitive route planning for unit replenishment in a distributed network are provided. In one example, a computer-implemented method can include determining, by a system operatively coupled to one or more processors, a time limit for unit replenishment at a unit dispensing device based on a unit depletion rate for the unit dispensing device. The computer-implemented method can also include generating, by the system, a route plan for the unit replenishment based on the unit depletion rate, the time limit, and respective unit depletion rates and respective time limits for other unit dispensing devices of a set of unit dispensing devices. The unit depletion rate can be based on historical and projected withdrawal data. Further, the unit dispensing device can be included in the set of unit dispensing devices located within a defined area. The time limit can (Continued)

indicate time remaining until the unit dispensing device is depleted of units.

19 Claims, 12 Drawing Sheets

(51) Int. Cl.
*G06F 17/00* (2019.01)
*G06Q 10/10* (2012.01)

(58) Field of Classification Search
USPC .............. 705/22, 28, 40, 43, 16, 7.13, 7.25; 700/103, 218, 244, 231; 235/379, 376, 235/380, 382, 486
See application file for complete search history.

(56) References Cited

U.S. PATENT DOCUMENTS

| | | | | |
|---|---|---|---|---|
| 5,844,808 | A * | 12/1998 | Konsmo | G06F 11/0748 700/244 |
| 5,930,771 | A * | 7/1999 | Stapp | G06Q 10/087 705/26.5 |
| 5,983,197 | A * | 11/1999 | Enta | G06Q 10/04 705/16 |
| 6,014,649 | A * | 1/2000 | Kobayashi | G06Q 20/108 705/43 |
| 6,378,770 | B1 * | 4/2002 | Clark | G07D 11/245 235/379 |
| 6,505,165 | B1 | 1/2003 | Berstis | |
| 7,627,525 | B2 | 12/2009 | Williams | |
| 7,783,571 | B2 | 8/2010 | Fish et al. | |
| 7,946,474 | B1 * | 5/2011 | Agrawal | G06Q 10/04 235/376 |
| 8,725,553 | B1 | 5/2014 | Turley et al. | |
| 9,031,579 | B2 | 5/2015 | Schwent et al. | |
| 2002/0038232 | A1 * | 3/2002 | Nihira | G06Q 10/06 705/7.13 |
| 2003/0004878 | A1 | 1/2003 | Akutsu et al. | |
| 2004/0220844 | A1 * | 11/2004 | Sanville | G06Q 10/0631 705/7.26 |
| 2005/0021363 | A1 | 1/2005 | Stimson et al. | |
| 2005/0096986 | A1 * | 5/2005 | Taylor | G06Q 20/20 705/16 |
| 2006/0106716 | A1 * | 5/2006 | Hurwitz | G06Q 20/102 705/40 |
| 2006/0112012 | A1 * | 5/2006 | Osborne | G06Q 20/1085 705/43 |
| 2006/0146839 | A1 * | 7/2006 | Hurwitz | G06Q 20/06 370/401 |
| 2009/0306820 | A1 * | 12/2009 | Simmons | G07F 9/026 700/244 |
| 2011/0264259 | A1 * | 10/2011 | Boyer | B25J 9/042 700/218 |
| 2012/0116566 | A1 * | 5/2012 | Bippert | G06Q 10/04 700/103 |
| 2012/0303448 | A1 | 11/2012 | Psillas et al. | |
| 2013/0191198 | A1 | 7/2013 | Carlson | |
| 2014/0067440 | A1 | 3/2014 | Stewart | |
| 2014/0339301 | A1 * | 11/2014 | Angus | G06Q 40/04 235/379 |
| 2015/0051731 | A1 * | 2/2015 | Neilan | G07D 11/245 700/244 |
| 2015/0178670 | A1 * | 6/2015 | Angus | G06Q 10/087 705/28 |
| 2016/0155090 | A1 | 6/2016 | Folk et al. | |
| 2016/0162865 | A1 * | 6/2016 | Crow | G07F 11/002 705/22 |
| 2017/0344957 | A1 * | 11/2017 | Ophardt | G06Q 10/063116 |

FOREIGN PATENT DOCUMENTS

| | | |
|---|---|---|
| JP | 2005108146 A | 4/2005 |
| WO | 2014097011 A | 6/2014 |

OTHER PUBLICATIONS

"A Process for Optimal Cash Deployment to a Network of Automatic Teller Machines," Feb. 24, 2004, 4 pages, International Business Machines Corporation.
Boonsam et al., "Efficiency Improvement for Multi Depot Vehicle Routing: A Case Study in Cash Distribution," Applied Mechanics and Materials, 2013, pp. 3667-3674, vols. 284-287, Trans Tech Publications, Switzerland.
Mell et al., "The NIST Definition of Cloud Computing," NIST Special Publication 800-145, Sep. 2011, National Institute of Standards and Technology, U.S. Department of Commerce, 7 pages.
"Sign Up With National City and Say Goodbye to ATM Fees; Enhanced Checking Accounts Address Everyday Needs," Apr. 2, 2007, PRWeb, 3 pages.
Non-Final Office Action received for U.S. Appl. No. 15/427,294 dated Feb. 8, 2019.
List of IBM Patents or Applications Treated as Related.

* cited by examiner

COGNITIVE ROUTE PLANNING FOR UNIT REPLENISHMENT IN A DISTRIBUTED NETWORK

BACKGROUND

The subject disclosure relates to route planning, and more specifically, cognitive route planning for unit replenishment in a distributed network.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate cognitive route planning for unit replenishment are described.

According to an embodiment, a computer-implemented method can comprise determining, by a system operatively coupled to one or more processors, a time limit for unit replenishment at a unit dispensing device based on a unit depletion rate for the unit dispensing device. The time limit can indicate an amount of time remaining until the unit dispensing device is depleted of units. The computer-implemented method can also comprise generating, by the system, a route plan for the unit replenishment based on the unit depletion rate, the time limit, and respective unit depletion rates and respective time limits for other unit dispensing devices of a set of unit dispensing devices.

According to an embodiment, a system can comprise a memory that stores computer executable components and a processor that executes computer executable components stored in the memory. The computer executable components can comprise a timing component that determines a time limit for unit replenishment at a unit dispensing device. The time limit indicates an amount of time remaining until the unit dispensing device is depleted of units. The computer executable components can also comprise a scheduling component that generates a route plan for the unit replenishment based on the depletion rate, the time limit, and respective unit depletion rates and respective time limits for other unit dispensing devices of a set of unit dispensing devices.

According to another embodiment, a computer program product for facilitating cognitive route planning for unit replenishment can comprise a computer readable storage medium having program instructions embodied therewith. The program instructions are executable by a processing component. The program instructions can cause the processing component to determine, by the processing component, a time constraint for unit replenishment at a unit dispensing device based on a unit depletion rate for the unit dispensing device. The time constraint can indicate an amount of time remaining until a quantity of units in the unit dispensing device satisfies a defined unit level. The program instructions can also cause the processing component to determine, by the processing component, a route plan that comprises the unit dispensing device and other unit dispensing devices in a set of unit dispensing devices. The route plan can be based on the unit depletion rate, the time constraint, and respective unit depletion rates and respective time constraints for the other unit dispensing devices.

DETAILED DESCRIPTION

Figure 1:
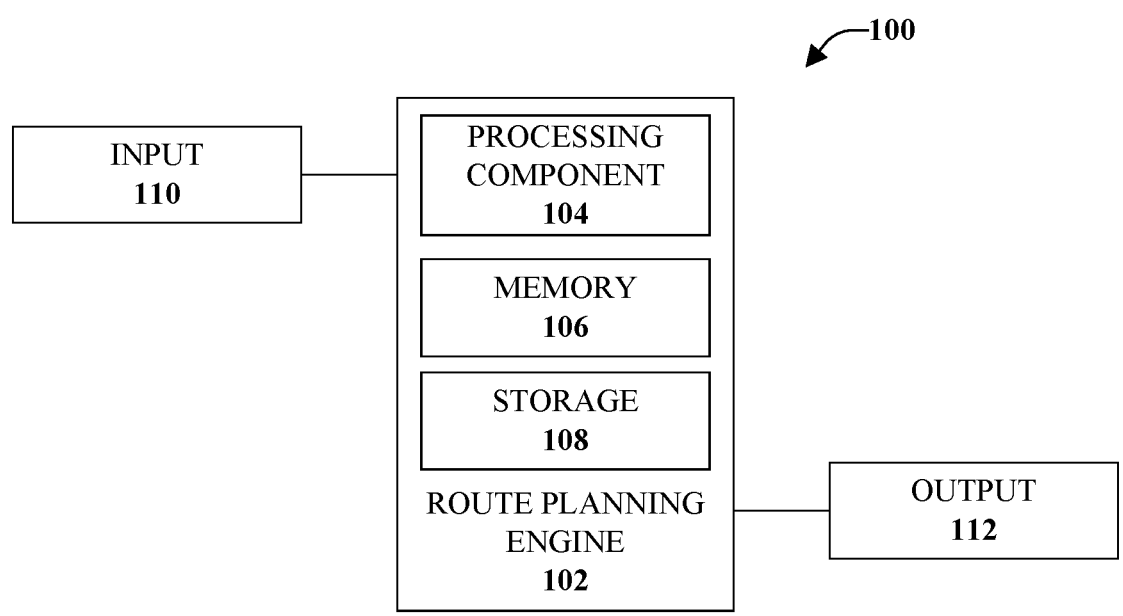
FIG. 1 illustrates a block diagram of an example, non-limiting system that facilitates cognitive route planning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various types of items, products, or units can be delivered with vehicles that follow a particular route, which can be planned in advance. At times, the preplanned route can be adequate and there can be enough units to serve demand for the units. However, in some cases, conformance to the preplanned route results in demand for the units exceeding the supply of the units. In these cases, another vehicle can be dispatched to deliver units to the location. However, this can cause a delay in availability of the units, as well as consuming extra resources (e.g., time, manpower, gasoline or other fuel, vehicle wear and tear, and so on) to make the additional unscheduled trip to replenish the units. The various aspects discussed herein can provide cognitive route planning for replenishment of units at a location based on a unit depletion rate at that location, a time limit until units are depleted, and respective unit depletion rates and respective time limits for other locations.

According to one or more implementations, the aspects discussed herein can determine a unit depletion rate at one or more unit dispensing devices such that units available at the one or more unit dispensing devices are not depleted, or do no fall below a defined level. A time limit for unit replenishment at one or more of the unit dispensing devices can be determined based, at least in part, on the unit depletion rate. Further, a route plan for unit replenishment vehicles can be determined based on a time limit for cash replenishment. As additional information is received, the route plan for the vehicles can be updated based on an updated cash depletion rate and an updated time limit for unit replenishment for one or more of the unit dispensing devices. In an additional implementation, determining the unit depletion can be based on predicted unit withdrawal by a select group of entities based on respective historical unit withdrawal patterns and/or respective behavioral data associated with entities included in the group of entities. As utilized herein an "entity" can be one or more computers, the Internet, one or more systems, one or more commercial enterprises, one or more computers, one or more machines, machinery, one or more actors, one or more users, one or ore more customers, one or more humans, and so forth, hereinafter referred to as an "entity" or "entities," depending on the context.

FIG. 1 illustrates a block diagram of an example, non-limiting system 100 that facilitates cognitive route planning in accordance with one or more embodiments described herein. Aspects of systems (e.g., non-limiting system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/ or commercial devices, hand-held devices, digital assistants, multimedia Internet enabled phones, multimedia players, and the like.

As illustrated, non-limiting system 100 can comprise a route planning engine 102, a processing component 104, a memory 106, and/or a storage 108. In some embodiments, one or more of the route planning engine 102, the processing component 104, the memory 106, and/or the storage 108 can be communicatively and/or operatively coupled to one another to perform one or more functions of the system 100.

In various embodiments, the route planning engine 102 can receive as input 110, a unit depletion rate for a unit dispensing device, a time limit for unit replenishment at the unit dispensing device, unit depletion rates for other unit dispensing devices, respective time limits for unit replenishment at other unit dispensing devices, and/or one or more denominations of needed units. The input 110 can be received electronically from the unit dispensing device over a communications network, wherein the unit dispensing devices are operatively coupled to one another and in wireless communication with the system 100, other systems, and one or more vehicles utilized to replenish units at the one or more unit dispensing devices. In accordance with an embodiment, the route planning engine 102, additionally or alternatively, can receive as input 110 historical unit withdrawal data that can be based on historical withdrawal of units. For example, a pattern of unit withdrawals can be determined over time (e.g., unit withdrawals are higher at a certain time of day or day of week). Other input 110 can include projected withdrawal data, which can be determined, at least in part, based on the historical unit withdrawal data. In another example, the projected withdrawal data can include data associated with a related activity that can indicate an impact on the unit depletion rate. The related activity can be an event occurring within a defined distance of a unit dispensing device. Examples of events can include small or large gatherings of individuals. In another example, the related activity can be associated with a venue at which concerts or special events are given and that is in proximity to a unit dispensing device.

In accordance with an embodiment, the route planning engine 102 upon or after receiving the input 110 can generate one or more route plans for unit replenishment at one or more unit dispensing devices. The route plans can be formatted as electronic information, graphical information or the like in various different embodiments. In some embodiments, the route planning engine 102 can alter a current route of one of more vehicles in order to facilitate unit replenishment based on the time limit for unit replenishment at the unit dispensing device such that the unit dispensing devices can have an appropriate amount of units for dispensing without complete depletion of the units. For example, the appropriate amount of units can be equal to an amount of units expected to be withdrawn within a defined interval (e.g., the next two hours, the next eleven hours). In some implementations, the vehicle dispatched can be a vehicle that was traversing a route that did not initially include the unit dispensing device.

The one or more routes generated can be output as output 112. The output 112 can be in various electronic formats including visually, such as on a display screen and/or audibly, such as through speakers or headphones. For example, the output 112 can include an electronic map-based output, wherein locations of one or more of the unit dispensing devices to be replenished can be identified on the electronic map. For example, an electronic mapping based application can be utilized to provide the locations and the one or more routes. According to some implementations, the output 112 can include electronic driving directions to one or more unit dispensing device along the route. For example, the electronic mapping based application can provide, within or overlaid on the electronic map, the electronic driving directions. According to some implementations, the output can include audio commands, such as driving commands. Circuitry to generate the audio commands can be included on a motherboard or a sound card connected to a set of external speakers or headphones.

In an example, the unit dispensing devices can be cash withdrawal stations or automated teller machines. The unit dispensing devices can be placed in various locations within a city for convenient withdrawal of units from the unit dispensing devices. For example, the unit dispensing devices can be located adjacent to a financial entity, can be located in a grocery store, can be located in a shopping mall, or in other locations. Within a certain geographical area, one or more unit dispensing devices could be used more heavily than other unit dispensing devices. For example, a unit dispensing device located in a high-traffic area could have a higher usage than another unit dispensing device located in a lower traffic area.

It is noted that although various aspects are discussed herein with respect to automated teller machines and cash disbursement from the automated teller machines, the disclosed aspects are not limited to this implementation. Instead, the various aspects can be utilized for a variety of items or products for which disbursement of the item and/or product can be part of an on-demand process including, but not limited to, monetary units, such as cash, and non-monetary units, such as products, pharmaceutical items, groceries, gasoline or fuel, and commodities.

In one non-limiting example, banks and other similar financial institutions follow a fixed route for their armored vehicles that replenish the cash in their automated teller machines. The fixed route does not take into account the rate at which cash can be withdrawn from any particular automated teller machine. As a result, sometimes some automated teller machines can be depleted of cash. This not only results in disgruntled customers, the banks also lose money in this situation in terms of automated teller machine fees, which can be a considerable part of a banks annual revenue. Further, if a customer fails to withdraw money from a particular automated teller machine he/she might start visiting any alternate automated teller machine and/or could chose to bank with a different financial institution, creating a permanent loss of customers for a bank.

In accordance with some implementations, the route planning engine 102 can estimate the cash withdrawal for one or more automated teller machine (or cash machine) based on several factors including a regular customer's intention to withdraw at a particular time, an indication that a unit dispensing device is experiencing unexpected (or expected) high-demand, events scheduled to occur at a venue located in proximity to a unit dispensing device. Based on this information, the route planning engine 102 can plan the routing of the cash delivery vehicles so that the likelihood of any automated teller machine running out of cash can be minimized or reduced to or below a defined threshold. For example, a time to distribute units to a unit dispensing device can be compared to a time limit for unit depletion at the unit dispensing device. If the time to distribute units is longer than the time limit for unit depletion, the route can be adjusted to replenish the unit dispensing device earlier in the route, or another vehicle can be dispensed to replenish units at the unit dispensing device. According to some implementations, the route planning engine 102 can determine the route for multiple vehicles in using a greedy waterfall method, described in further detail below.

According to various implementations, the route planning engine 102 can take into consideration other unit dispensing devices in a geographic area (e.g., a neighborhood) and an impact of other options as it relates to a cash depletion rate. For example, the route planning engine 102 can consider the ability to withdraw units through another method, such as a cash withdrawal from a cashier at a local grocery store using a debit card. In some implementations, the route planning engine 102 can receive as input 110 individual customer behavior and can use the behavior to more accurately predict unit withdrawal from one or more unit dispensing devices. In order to perform the prediction, the route planning engine 102 can evaluate behavior of entities withdrawing units in order to detect a pattern of withdrawal. Based on detecting a pattern of withdrawal, the route planning engine can predict that an entity will withdrawal a certain amount of units on a certain day/time and can perform this prediction for all entities that historically withdraw units from a particular unit dispensing machine. Further, the route planning engine 102 can determine a replenishment schedule in order for vehicles to be routed such that units can be replenished without delay or with minimal delay. The replenishment schedule can be created based on determining a distance between a source of units (e.g., origination location of a vehicle) or a current location of the vehicle and to a first unit dispensing device having a shortest time to unit depletion. The remainder of the route can be determined based on distances between the first unit dispensing device and other unit dispensing devices and associated unit depletion times. Further, the route planning engine 102 can determine a variable unit rate depletion and route vehicles based on the variability level. For example, units within a unit dispensing device can deplete faster than expected, or slower than expected and adjustments to the route can be made based on the updated depletion rate. Thus, if a unit dispensing device is being depleted faster than expected, a replenishment of that unit dispensing device can occur sooner within the route than originally planned, or another vehicle can be dispatched to replenish that unit dispensing device.

According to various implementations, the route planning engine 102 can utilize the input 110, which can be historical data, to determine an initial unit withdrawal rate for a determined time period, such as a day of the week and/or a time of day. Additionally or alternatively, the route planning engine 102 can receive data from unit dispensing device location applications (which can be electronic mapping applications) associated with one or more entities to determine which entities might be exhibiting a potential intention to withdraw units from a unit dispensing device. For example, respective computing equipment associated with the one or more entities can collect and share data related to respective locations of the one or more entities. Based on the location information, the route planning engine 102 can determine a likelihood of an entity using a first unit dispensing device that can be geographically located closer to the entity, rather than a second unit dispensing device that can be geographically located at a further distance away from the entity than the first unit dispensing device. The likelihood can be based on distances between the entity and the unit dispensing devices, based on a determined preference of an entity for one of the unit dispensing devices. Based on the location information, the route planning engine 102 can review historical data and/or behavioral data to determine how many units can be expected to be withdrawn by one or more of the entities.

In an additional implementation, the route planning engine 102 can update a prediction of the number of units likely to be withdrawn based on local events. For example, such local events can include, but are not limited to, concerts, street fairs, athletic events, political events, and so on. For example, based on a determination that a local event is planned, or is occurring (e.g., unplanned), the time to depletion for the unit dispensing devices can be re-evaluated and updated based on an estimate of the number of entities that are expected to attend the event and withdraw units from the unit dispensing devices.

Upon or after a unit depletion rate for one or more unit dispensing units in a geographical area is determined, the system 100 can utilize, in an example, a non-optimal Traveling Salesman Problem (TSP) solution based on a greedy method to determine an optimal route of a vehicle from a source of units to cover one or more unit dispensing device and return to the source of units if additional units should be to be picked up and delivered to the unit dispensing device or to other unit dispensing devices. TSP can ask the following question: "Given a list of unit dispensing devices and the distances between pairs of unit dispensing devices, what is the shortest possible route that visits each unit dispensing device exactly once and returns to a point of origin (e.g., a location where units within a vehicle are replenished)?".

According to some implementations, the route can be updated or corrected if a unit dispensing device depletes faster than was expected based on a predicted unit depletion rate for the unit dispensing device. For example, the unit dispensing devices can be communicatively or operatively coupled to the system 100. Further, one or more unit dispensing devices can relay information related to the units available at the unit dispensing device. In an example of automated teller machines, the information communicated can include the amount of cash remaining at the unit dispensing device as well as denominations of the cash (which can be expressed in dollars or another form of currency).

In accordance with one or more implementations, one or more unit dispensing devices can be replenished more often during the route based on whether the respective unit dispensing device can be expected to deplete quickly. Thus, a vehicle, during a single route or multiple routes, can visit a unit dispensing device more than once prior to returning to a source of units.

Based on a route being updated or corrected, information related to the correction can be stored. The information can include an initial determination of a unit depletion rate, a corrected unit depletion rate, and factors that could have influenced the change. Such factors can include weather and/or unforeseen events, such as traffic accidents or medical issues. The correction information can be utilized for future determinations of unit depletions rates. Further, the problem can be generalized for more than one vehicle.

The systems and/or the components of the systems discussed herein can be employed to use hardware and/or software to solve problems that are highly technical in nature (e.g., determine a route for a vehicle that conforms to an expected unit depletion rate at a unit dispensing device based on a consideration of other unit dispensing devices and respective unit depletion rates of the other unit dispensing devices; determine a unit depletion rate that conforms to historical withdrawal and expected future withdrawal data related to one or more entities; determine one or more internal factors and/or external factors that can impact the unit depletion rate; determine one or more routes based on a time limit that indicates an amount of time remaining until a unit dispensing device is depleted of units), that are not abstract and that cannot be performed as a set of mental acts by a human. For example, one or more of the unit dispensing devices can communicate respective unit availabilities (and details related to respective remaining units) as units are withdrawn and updates to the route can be implemented based on the communicated unit availability (and associated details) which cannot be determined as a set of mental acts. For example, if an entity withdraws ten units, the unit dispensing device that dispensed the units can communicate information indicating that there are ten less units in the unit dispensing device. In another example, since the unit availability can be communicated directly to the in-route vehicle, determining the route can include evaluating respective unit availabilities communicated by other unit dispensing devices such that one or more unit dispensing devices can be replenished with units prior to a unit dispensing device distributing all available units. Since the unit delivery to the multiple unit dispensing devices should be coordinated before depletion can be experienced at any of the unit dispensing devices, this coordination cannot be determined as a set of mental tasks. In addition, since the unit available at one or more dispensing device might not be available (e.g., due to security issues, prevention), a time to unit depletion cannot be determined and, therefore, a route that mitigates a unit dispensing device being depleted of units cannot be determined as a set of mental acts. Further, some of the processes performed can be performed by specialized computers for carrying out defined tasks related to the route planning area. For example, a human, or even thousands of humans, cannot efficiently, accurately and effectively manually generate route plans for unit replenishment at a multitude of unit dispensing devices while maintaining an adequate unit level at one or more unit dispensing device to accommodate expected unit depletion rates. The various systems and/or components of the systems can be employed to solve new problems that arise through advancements in technology, computer networks, the Internet and the like. The various systems can provide technical improvements to cognitive route planning by improving processing efficiency among processing components in a unit dispensing device system by providing updated unit dispensing rates for one or more unit dispensing device and to automatically reconfigure the one or more routes, automatically add a new route, and/or divert a vehicle from an adjacent (or non-adjacent) route to distribute units prior to complete unit depletion at one or more unit dispensing devices. In addition, the various aspects cannot be performed by a human (e.g., using approaches that are greater than the capability of a single human mind). For example, the amount of data processed, the speed of processing of the data, and/or the electronic data types processed by the route planning engine 102 over a certain period of time can be respectively greater, faster, and different than the amount, speed and data type that can be processed by a single human mind over the same period of time.

Figure 2:
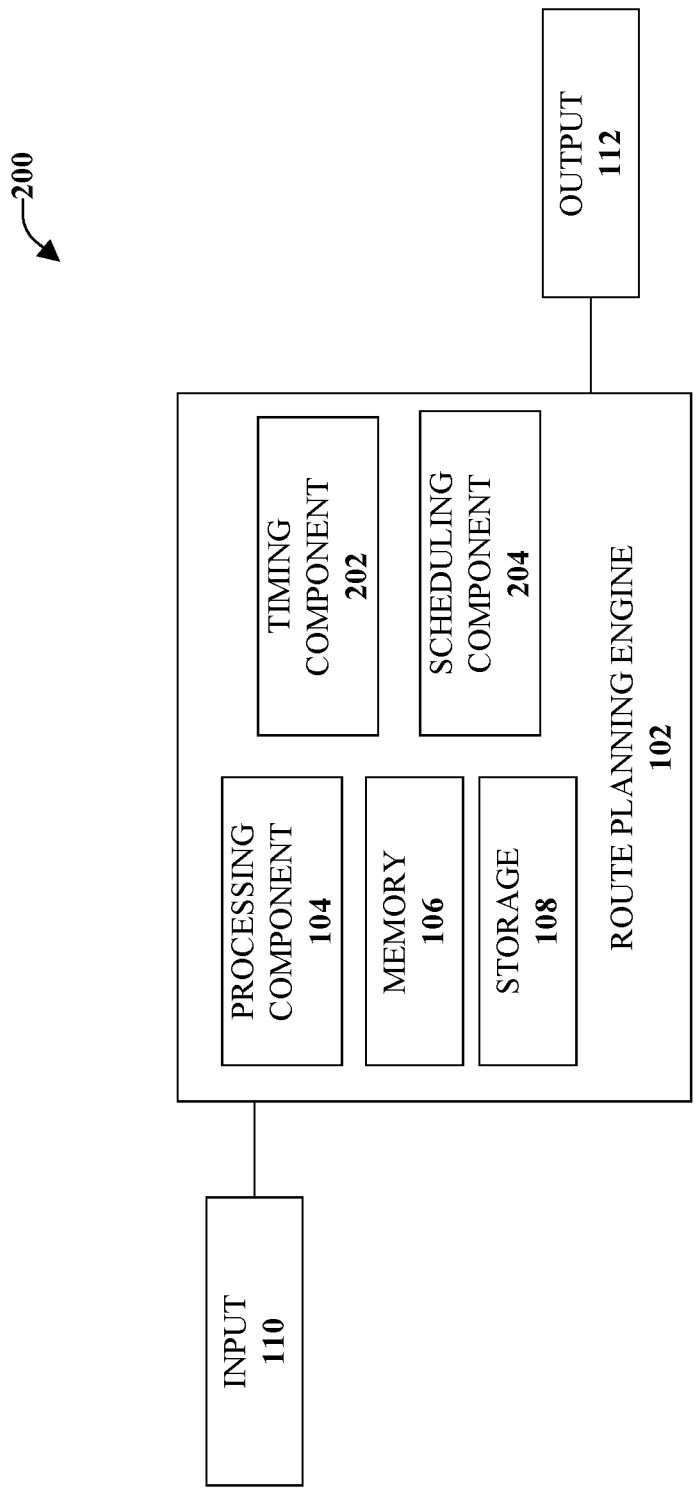
FIG. 2 illustrates a block diagram of an example, non-limiting system that facilitates cognitive route planning for unit replenishment in accordance with one or more embodiments described herein.

FIG. 2 illustrates a block diagram of an example, non-limiting system 200 that facilitates cognitive route planning for unit replenishment in accordance with one or more embodiments described herein. Repetitive description of like elements employed in other embodiments described herein is omitted for sake of brevity.

The non-limiting system 200 can comprise one or more of the components and/or functionality of system 100, and vice versa. As illustrated, the route planning engine 102 of system 200 can comprise a timing component 202 that based at least in part on the input 110 can determine an expected time limit for unit replenishment at a unit dispensing device. For example, the input 110 can include historical withdrawal data and projected withdrawal data. The historical data can include patterns or habits associated with one or more entities that have historically withdrawn units from the unit dispensing device and/or other unit dispensing devices within a defined area. The defined area can be a geographic area, for example. In another example, the geographic area can comprise unit dispensing devices within a vehicle replenishment route. In another example, the defined area can comprise two or more contiguous vehicle replenishment routes. For example, a route can be a travel pattern for replenishment and can include an amount of time necessary to replenish the unit dispensing devices within the route with units. The time necessary can include travel time (e.g., in a vehicle, on foot, and so on) and time to install the units into the unit dispensing device.

Also included in the non-limiting system 200 can be a scheduling component 204 that can generate a route plan for the unit replenishment. The route plan can be based on the unit depletion rate, the time limit, and respective unit depletion rates and respective time limits for other unit dispensing devices of the set of unit dispensing devices. The scheduling component 204 can generate the route plan in order to increase a processing speed of the unit replenishment at a set of unit dispensing devices.

According to an implementation, the scheduling component 204 can determine a route of a vehicle from a source of units to the unit dispensing device and the other unit dispensing devices. The route can be determined by the scheduling component 204 in an order selected based on the time limit and the respective time limits. For example, a first unit dispensing device can have a time limit of x minutes and a second dispensing device can have a time limit of y minutes, where y is less than x. In this example, the scheduling component 204 can schedule delivery of units at the second dispensing device earlier in the route than the scheduled delivery of units at the first dispensing device since the time limit for the second unit dispensing device is shorter than the time limit of the first unit dispensing device.

In an additional or alternative implementation, the scheduling component 204 can determine multiple routes for the defined area, contiguous areas, and/or overlapping areas. Thus, the scheduling component 204 can determine a first route for a first vehicle, a second route for a second vehicle, and subsequent routes for subsequent vehicles. The first route and the second route can originate at a source of the units and can be determined based on the time limit of the first unit dispensing device and respective time limits for other unit dispensing devices. For example, two vehicles can be dispatched by the scheduling component 204 to service the defined area. Further to this example, both vehicles can deliver units to a first unit dispensing device based on a depletion rate of units at the first unit dispensing device. Other unit dispensing devices might be serviced by only one vehicle, or might not be serviced at all during a particular route depending on the respective unit depletion rate. In another example, based on a depletion rate of a unit dispensing device, a vehicle scheduled for a route in a contiguous area can be dispatched to deliver units to the unit dispensing device that was not part of an original route of the vehicle.

Figure 3:
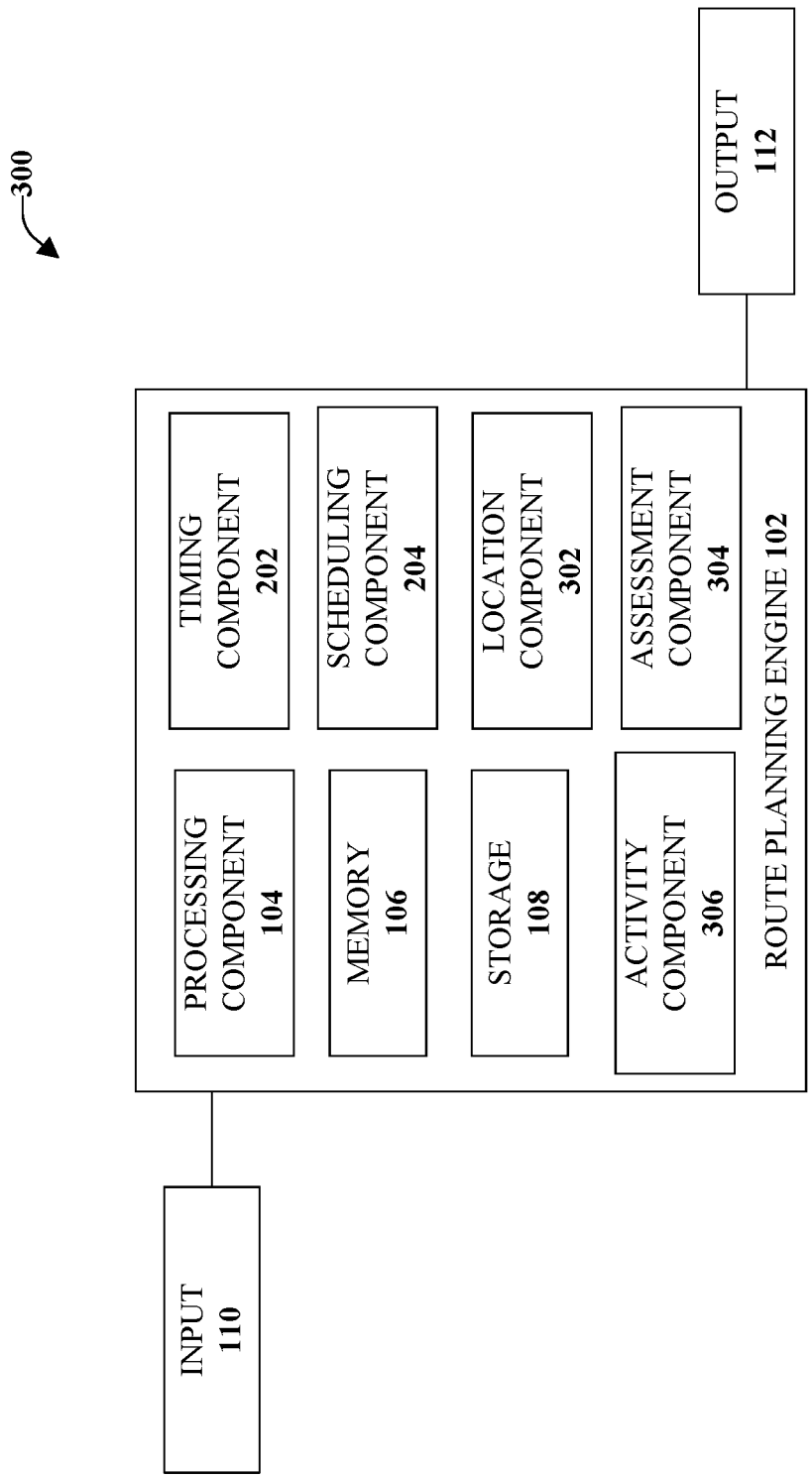
FIG. 3 illustrates a block diagram of an example, non-limiting system that facilitates cognitive route planning based information gathered from one or more computing devices in accordance with one or more embodiments described herein.

FIG. 3 illustrates a block diagram of an example, non-limiting system 300 that facilitates cognitive route planning based information gathered from one or more computing devices in accordance with one or more embodiments described herein. Repetitive description of like elements employed in other embodiments described herein is omitted for sake of brevity.

The non-limiting system 300 can comprise one or more of the components and/or functionality of system 100 and/or system 200, and vice versa. According to an implementation, unit depletion rates at one or more unit dispensing devices can be determined based on information requests processed through one or more computing devices that can be located within, or near, a defined area of one or more unit dispensing devices. The related activity at the one or more computing devices can indicate a potential impact on one or more unit depletions. For example, the activity can be a search, by an entity through a computing device, for unit dispensing devices in an area where the entity is currently located. The search can be through an electronic mapping application installed and executing on the computing device. However, other manners of searching for unit dispensing devices can be utilized with the various aspects disclosed herein.

Based on an indication that the entity has requested a location of unit dispensing devices, a location component 302 can identify the location of the computing device within the defined area, or in an adjacent area. The identification by the location component 302 can be determined based on information received from the computing device or another device or system. The location component 302 also can determine or predict which unit dispensing device the entity associated with the computing device can be likely to select for withdrawal of units. For example, if the entity is located in an adjacent area, but a unit dispensing device in the defined area can be a shorter travel distance, the location component 302 can predict that the entity might travel to the closer unit dispensing device. In another example, the location component 302 can determine which unit dispensing device the entity might visit based on a selection by the entity of the unit dispensing device within the electronic mapping application (or other manner of searching for unit dispensing devices).

An assessment component 304 can determine a quantity of units expected to be withdrawn from the unit dispensing device based on information known about the identity of the entity associated with the computing device. For example, the assessment component 304 can access historical unit withdrawal information of the entity and can predict a quantity of units expected to be withdrawn by the entity. In another example, the assessment component 304 can determine that the entity might withdraw a maximum amount of units available for withdrawal during a single transaction.

In another example, the assessment component 304 can determine an expected withdrawal level based on an event occurring within the area. For example, an activity component 306 can determine an event is occurring based on information received from one or more computing devices within or near the defined area. The event can be a scheduled event that can be known in advance, such as an athletic event, concert, and so on. However, according to some implementations, the event can be an unscheduled event that develops in an ad hoc manner. For example, two friends can decide to get together and, through various social media and/or other information sharing applications, more friends can decide to join them. It can also be determined that for the activity the friends are sharing, one or more of the friends might be likely to withdraw units (e.g., cash in this example) from a nearby unit dispensing machine (e.g., an automated teller machine in this example).

Based on the determination by the activity component 306, the assessment component 304 can determine a quantity of units expected to be withdrawn for the unit dispensing unit. For example, the determination by the assessment component can be made based on information known about respective identities of entities (e.g., the friends in the above example) associated with the one or more computing devices. The information known can be historical unit withdrawal quantities, for example.

Accordingly, the system 300 can be configured to replenish units in unit dispensing devices using one or more vehicles. A unit depletion rate at one or more of the unit dispensing devices can be predicted and the time limit for unit replenishment at one or more of those unit dispensing devices can be predicted based on the depletion rate. Further, a route plan for one or more of the vehicles can be created based on the time limit for cash replenishment. Further, according to some implementations, the route plan can be updated for the vehicles based on updated predicted unit depletion rates and updated time limits for unit replenishment for one or more of the unit dispensing devices. In some implementations, predicting the unit depletion can be based on predicted unit withdrawal by a selective group of entities based on their historic cash withdrawal patterns and behavioral data, for example.

Figure 4:
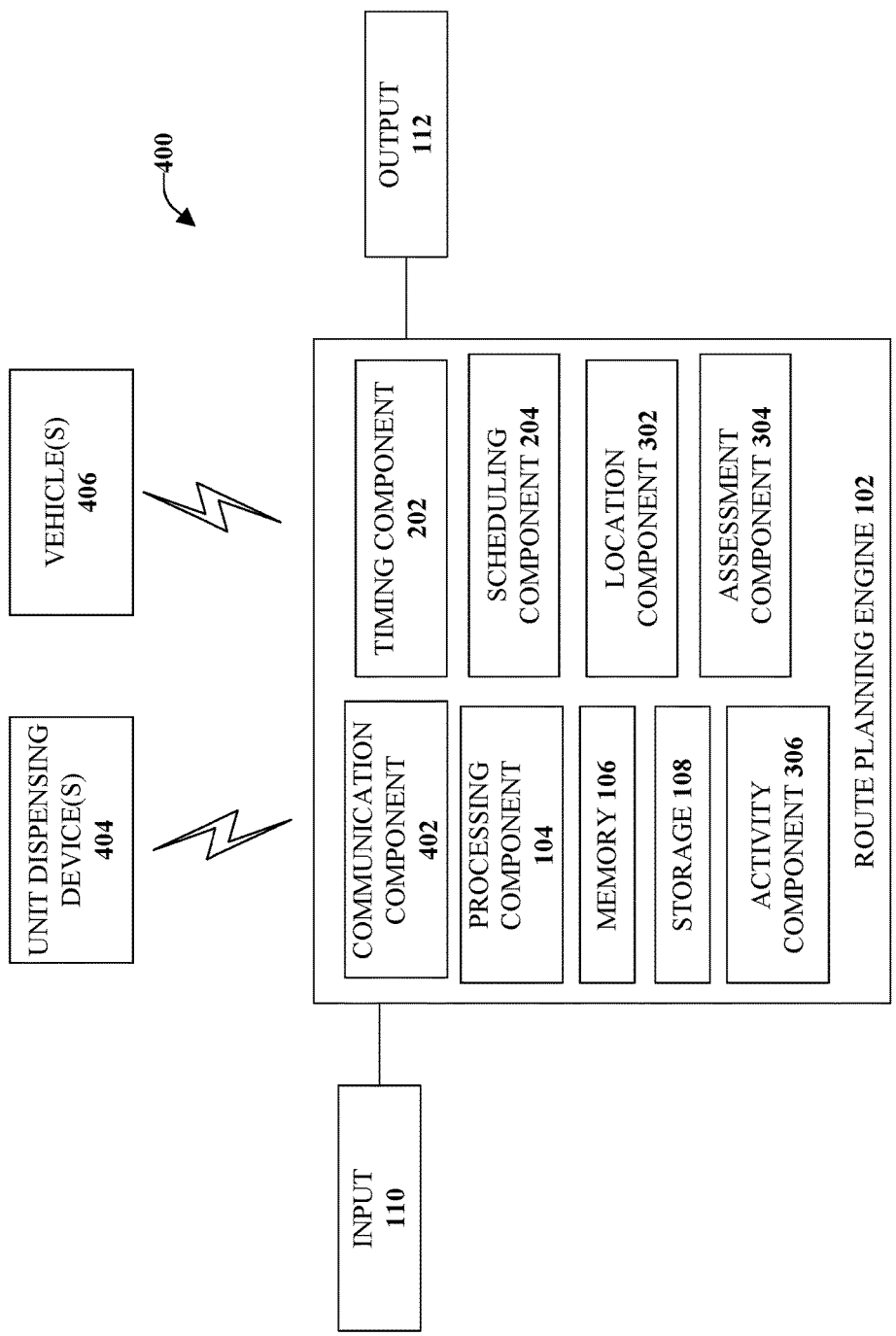
FIG. 4 illustrates a block diagram of an example, non-limiting system that facilitates cognitive route planning based information gathered from one or more computing devices in accordance with one or more embodiments described herein.

FIG. 4 illustrates a block diagram of an example, non-limiting system 400 that facilitates cognitive route planning based information gathered from one or more computing devices in accordance with one or more embodiments described herein. Repetitive description of like elements employed in other embodiments described herein is omitted for sake of brevity.

The non-limiting system 400 can comprise one or more of the components and/or functionality of system 100, system 200, and/or system 300, and vice versa. A communication component 402 can receive the input 110 from one or more unit dispensing devices 404 and/or from one or more vehicles 406. For example, the information received as input 110 from the one or more unit dispensing devices 404 can include a quantity of units available, units withdrawn, a time limit remaining until all units have been depleted from the unit dispensing device, or a time limit until a defined unit level will be reached. The defined unit level can be a quantity that is greater than zero and can be implemented as a reserve of units maintained in the unit dispensing device in the event that units are not replenished as quickly as necessary. The reserve of units attempts to mitigate the chances of the unit dispensing device being placed, at least temporarily, out of order due to all units being depleted. According to an implementation, the timing component 202 can determine the time limit based on a determination of another amount of time remaining before a quantity of units within the unit dispensing device reaches a defined unit level. The defined unit level can be configurable based on a time of day, day of week, one or more events occurring in the area, weather conditions, and so on. In an example, if a snow storm is expected, which can hinder traffic, the defined unit level can be adjusted to allow more travel time for replenishment of the units.

In an implementation where the units are currency, the input 110 received at the communication component 402 from the one or more unit dispensing devices 404 can include denominations of the currency available the unit dispensing unit. For example, a unit dispensing device, which can be an automated teller machine in this example, can be initially stocked with a defined domination of currency. For example, the defined amount of currency can be b number of a first denomination value, c number of a second denomination value, d number of a third denomination value, and so on, where b, c, and d can be integers and can be the same integer or different integers. Thus, if more of a first denomination value is withdrawn than expected, while a second denomination value and a third denomination value are withdrawn at a rate that is slower than expected, replenishment at that automated teller machine can comprise the first denomination value, while the second denomination value and the third denomination value are not replenished, or a smaller number of units are replenished at the second denomination value and/or the third denomination value.

According to some implementations, the input 110 received at the communication component 402 from the one or more vehicles 406 can include vehicle location, units being delivered, units already delivered, and associated denominations of the units. Further, the input 110 received from the one or more vehicles 406 can include a condition of the vehicle, external influences affecting the vehicle, and/or conditions of one or more occupants of the vehicle. The condition of the vehicle can include, but are not limited to, whether the vehicle is operating properly or whether a problem has been encountered (e.g., mechanical failure, flat tire, accident, and so on). The external influence affecting the vehicle can include, but are not limited to, weather conditions, traffic conditions, road blockages and/or detours, and so on. For example, weather conditions, such as rain or snow can negatively impact a travel time (e.g., increase travel time). Further, traffic conditions, such as rush hour traffic, traffic accidents, and so on, can also negatively affect (or increase) the travel time. The conditions of one or more occupants of the vehicle can relate to medical conditions. For example, if an occupant of a vehicle experiences a major medical incident (e.g., seizure, loss of consciousness, heart attack, broken limbs), the occupant might need immediate medical attention, which can place the vehicle out of commission while medical aid can be administered.

In some instances, the input 110 can include a current location of the vehicle and a speed at which the vehicle is traveling. For example, if the vehicle is traversing a defined route and a location of the vehicle (e.g., as determined by a Global Positioning System (GPS) or another manner of location determination) indicates that the vehicle has deterred from the route, it can indicate a problem with the route (e.g., closed road, detoured traffic) or can indicate that an unauthorized person is operating the vehicle (e.g., the vehicle has been stolen) and an action can be taken related to the vehicle. In another example, it can be expected that the vehicle might arrive at a next scheduled destination (e.g., the next dispensing unit) at a certain time (or within a certain time range, such as a range of 5 minutes, or 10 minutes). If the vehicle does not arrive before expiration of the time range, it can indicate a problem with the vehicle (and communication of the vehicle), the route, or another issue that should be addressed. In the example where communication of the vehicle has been compromised or has malfunctioned, information received from the unit dispensing machines can be utilized to determine if the vehicle is completing assigned stops and replenishing units as scheduled.

According to an example, the communication component 402 can monitor an actual unit depletion rate of a unit dispensing device, as discussed herein. Based on this monitoring, the timing component 202 can determine an adjusted time limit for the unit replenishment based on a determination that the actual unit depletion rate is different from the unit depletion rate by a defined amount. For example, a unit depletion rate can be determined to be at a first rate, however, the actual unit depletion rate is at a second rate, which can be faster than the first rate or, alternatively, slower than the first rate. The defined amount can be a value that can be selected such that small difference variations between the rates can be ignored. In an example where the unit dispensing devices are automated teller machines, a certain automated teller machine might be utilized during a lunch period or at the end of the day on Friday. However, on a particular Friday, such as before a holiday weekend, an office closes earlier than usual to allows individuals to get an earlier start on the holiday. In this case, there can be more withdrawals from an automated teller machine in the middle of the afternoon, when the withdrawals were not expected until after 5 p.m. In this case, although the depletion rate can increase during the middle of the afternoon, it can level out after 5 p.m. since most of those withdrawals have already been made. In this case, the increase in the depletion rate can be ignored.

However, in some cases the depletion rate can be increased due to withdraws of a larger amount than an anticipated amount are being made, or that entities are withdrawing from a first unit dispensing device when, normally, those entities withdraw units from a second unit dispensing device, or otherwise the withdrawals by these entities are unusual or not based on historical data analysis. This can indicate another unit dispensing machine is out of service and/or external conditions (e.g., weather, traffic, emergency) are preventing access to the other unit dispensing machine. Alternatively or additionally, it can indicate a larger number of entities are at the location of the first unit dispensing machine, which can indicate an unplanned event. In these situations, the unit depletion rate can increase faster than a tolerance level and, therefore, the scheduling component 204 can adjust the route plan, create a new route plan, or modify another route plan, as will be described further below. Further to this example, if a time between entities withdrawal of units is faster than expected, it can indicate a spike in withdrawals and a vehicle can be dispatched to that location.

In another example, the actual unit depletion rate can be slower than the expected unit depletion rate. For example, external conditions can be preventing entities from accessing a certain unit dispensing device and, therefore, these entities might withdraw units from a different unit dispensing device. In another example, the unit depletion rate can be slower than expected based on an unplanned event occurring at a different location and unit dispensing devices within the different area being used instead of the expected unit dispensing device. In an example related to cash withdrawals from an automated teller machine, a person can intend to meet friends at a local restaurant and plans to withdraw cash on the way to the location. Historically, an automated teller machine near her home (or work) is used for the cash withdrawal, however, today she is running late and instead decides to withdraw cash at the automated teller machine near the restaurant to save time. Thus, the expected withdrawal from the automated teller machine near her home/work can be slower than expected, while the expected withdrawals from the automated teller machine near the restaurant are faster than expected.

Based on the adjustments made by the timing component 202, the scheduling component 204 can generate an updated route plan for the unit replenishment. The updated route plan can be based on the actual depletion rate and the adjusted time limit and based on the respective unit depletion rates and the respective time limits for the other unit dispensing devices of the set of unit dispensing devices.

According to some implementations, the timing component 202 can determine an expedited time limit for the unit replenishment at the unit dispensing device based on an expedited unit depletion rate for the unit dispensing device. The expedited unit depletion rate can be based on a determination that unit withdrawals from the unit dispensing device are more than expected. Further to this implementation, the scheduling component 204 can generate an updated route plan for the unit replenishment based on the expedited unit depletion rate, the expedited time limit, and the respective unit depletion rates and the respective time limits for other dispensing devices of the set of unit dispensing devices. To generate the updated route plan, the scheduling component 204 can dispatch a unit replenishment vehicle to the unit dispensing device. The unit replenishment vehicle can be associated with another defined area and might not have been originally scheduled to deliver units to the unit dispensing device.

Figure 5:
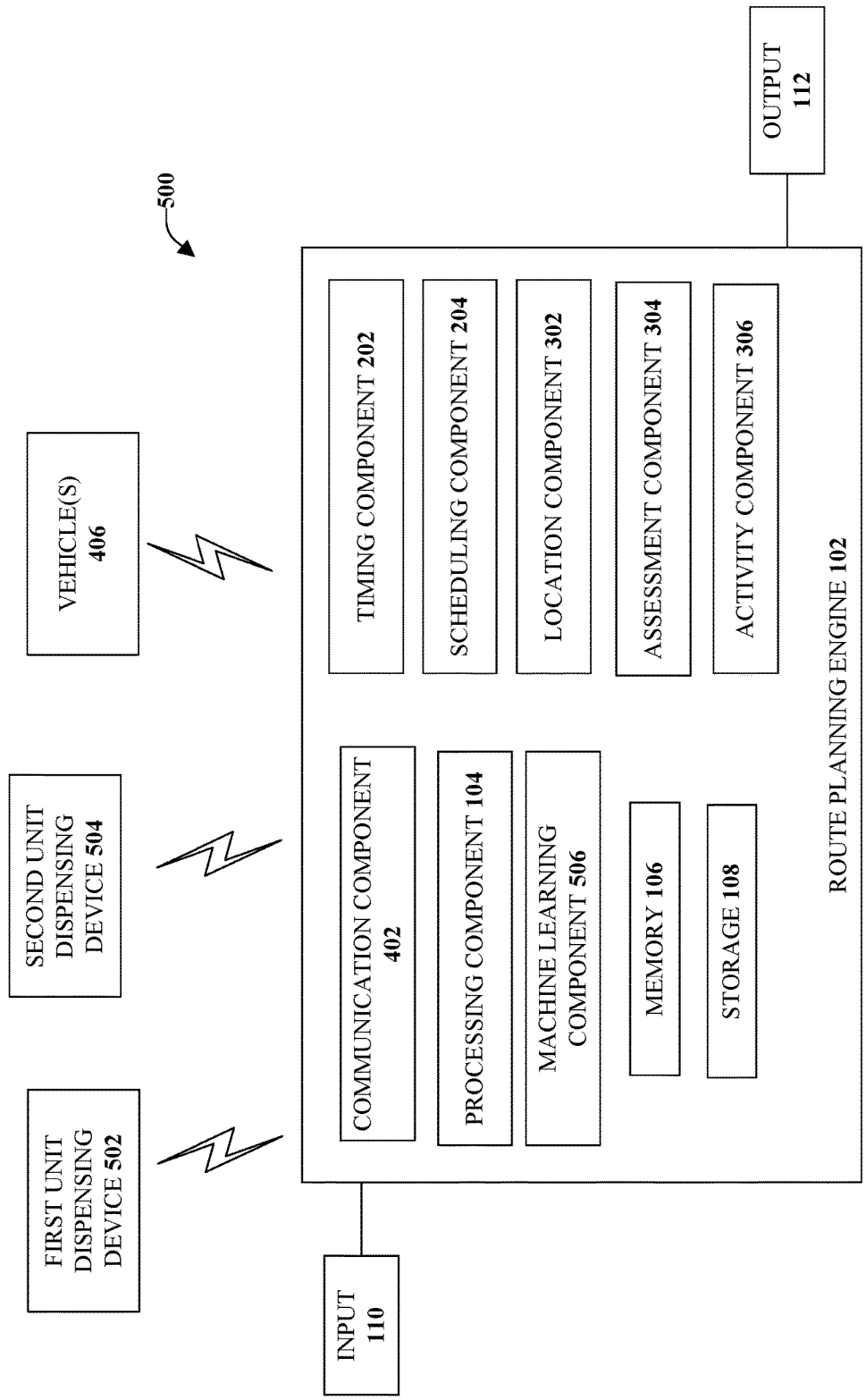
FIG. 5 illustrates a block diagram of an example, non-limiting system that facilitates cognitive route planning based information gathered from one or more computing devices in accordance with one or more embodiments described herein.

FIG. 5 illustrates a block diagram of an example, non-limiting system 500 that facilitates cognitive route planning based information gathered from one or more computing devices in accordance with one or more embodiments described herein. Repetitive description of like elements employed in other embodiments described herein is omitted for sake of brevity.

The non-limiting system 500 can comprise one or more of the components and/or functionality of system 100, system 200, system 300, and/or system 400 and vice versa. The timing component 202 can determine a first time limit for a first unit replenishment at a first unit dispensing device 502 and a second time limit for a second unit replenishment at a second unit dispensing device 504. The first unit dispensing device 502 and the second unit dispensing device 504 can be located in a defined area. The defined area can be a geographic area, for example. The first time limit and the second time limit can be based on respective historical withdrawal data and respective projected withdrawal data. For example, a first set of historical withdrawal data and a first set of projected withdrawal data can be associated with the first unit dispensing device 502. Further, a second set of historical withdrawal data and a second set of projected withdrawal data can be associated with the second unit dispensing device 504. The first time limit can indicate a first amount of time remaining until respective units in the first unit dispensing device 502 reach a first depletion level. The second time limit can indicate a second amount of time remaining until respective units in the second unit dispensing device 504 reach a second depletion level.

The scheduling component 204 can determine a route plan for the first unit replenishment and the second unit replenishment. The scheduling component 204 can determine the route plan based on the first depletion level, the first time limit, the second depletion level, the second time limit, and respective unit depletion rates and respective time limits for other unit dispensing devices of a set of unit dispensing devices in the defined area. The first unit dispensing device 502 and the second unit dispensing device 504 can be included in the set of dispensing devices in the defined area. According to an implementation, the scheduling component 204 can schedule the second unit replenishment before the first unit replenishment based on a determination that the second time limit is shorter than the first time limit.

According to an implementation, the respective projected withdrawal data can include data associated with a related activity that indicates a potential impact on the first depletion level. For example, the related activity can be a search for unit dispensing devices within an electronic mapping application installed on a computing device. For example, a search can be initiated at a device to find all unit dispensing devices that are near the computing device (e.g., near an entity operating a mobile device). Further to this implementation, the location component 302 can determine a location of the computing device within or near the defined area. Based on the location information, the assessment component 304 can determine a quantity of units expected to be withdrawn from the first unit dispensing device 502 based on information known about an identity of an entity associated with the computing device.

In an alternative or additional implementation, the respective projected withdrawal data can include data associated with a related activity that indicates an impact on the first depletion level. The related activity can be an event occurring within or near the defined area. Further to this implementation, the activity component 306 can identify an occurrence of the event based on data received from one or more computing devices located within or near the defined area. The assessment component 304 can determine a quantity of units expected to be withdrawn from the first unit dispensing device 502 based on information known about respective identities of entities of the one or more computing devices. The event can be an unscheduled event.

Further, in an embodiment, the system 500 can include a machine learning component 506. The machine learning component 506 can perform a set of machine learning computations associated with the input 110 and/or the output 112. For example, the machine learning component 506 can determine routes for one or more geographic areas, which can be separate routes or overlapping routes. According to another example, the machine learning component 506 can alter one or more routes based on updated information received from one or more unit dispensing devices, one or more routed vehicles, one or more computing devices, and so on.

The machine learning component 506 can utilize machine learning systems that have been explicitly or implicitly trained to learn, determine or infer system (or entity) needs, unit capacity requirements, routing alteration requirements, and so on, that achieve current and/or anticipated system/unit capacity requirements related to a quantity of units, a denomination of units, a target replenishment rate, an anticipated replenishment rate, and so on. It is to be appreciated that machine learning systems can be implemented in one or more of the components to generate explicitly and/or implicitly trained models that provide the desired routes that are determined to replenish the one or more unit dispensing devices prior to depletion of units from the one or more dispensing devices. The machine learning systems can learn systems, networks, etc., identify respective depletion rates, respective time limits, and so on in order to determine or infer one or more routes that should be traversed that conform to actual replenishment of units that mitigates downtime and reliably achieves system objectives with respect to availability of units at one or more unit dispensing machines.

As discussed, the various aspects disclosed consider historic data to make initial predictions on the unit withdrawal rate for any particular time period such as a day or part of the day. Unit dispensing device finder applications or programs as used by entities through respective computing devices can be used to determine which entities are showing a potential intention to withdraw units from the unit dispensing devices. In an example, the program can be an automated teller machine finder application used by banking customers. These applications or programs can be utilized to collect data based on the customer locations. Other manners of determining the entities location and/or intention to withdraw from a unit dispensing device can also be utilized (e.g., habits, patterns, and so on). The various aspects can also take into consideration an entity's preference to withdraw units from non-traditional source. For example, an entity can prefer to withdraw money using a debit card at a grocery store, rather than withdrawing money from an automated teller machine on certain days.

The various aspects can also review historic and behavioral data to predict how many units might be withdrawn by one or more of the entities. Further, the various aspects can correct or update the prediction for one or more unit dispensing device for local events such as a concert, street fairs, or a ball game and for local weather conditions.

At about the same time as a depletion rate for one or more unit dispensing devices can be determined, the machine learning component 506 (or another system component) can use a non-optimal TSP solution based on greedy method to find the optimal route of the replenishment vehicle from a source of units to cover one or more unit dispensing devices and return to the source of units if additional units are needed. The route can be updated and corrected if any unit dispensing device depletes faster than anticipated. Some unit dispensing devices can be visited more often during the route if it requires units before the vehicle returns home (e.g., to the source of units). One or more correction of the predicted result can be recorded and further used for learning and characterization. Further, the problem can be generalized for more than one replenishment vehicle.

As discussed a non-optimal TSP based problem for vehicle routing can be utilized with the disclosed aspects. Thus, a problem definition can be expressed as, how can a vehicle complete a tour of all unit dispensing devices with a few constraints. For example, a constraint can be that all unit dispensing devices unit requirements can be satisfied within a time limit defined for one or more of the unit dispensing devices. Another constraint can be that the farthest geographically located unit dispensing devices could have the tightest time constraints of fulfillment. The unit requirements as well as the time limit constraints for one or more unit dispensing devices can be subject to change. Further, there could be more than one vehicle fulfilling the requirements.

In an example of a non-optimal TSP based problem for single vehicle routing, a greedy water-fall method could be utilized. The solution interval can be partitioned in time intervals and the solution can be computed and updated for one or more intervals. Further, for one or more time intervals, various actions can be performed. First, a cognitive route planning for a TSP with traditional non-optimal algorithms that minimizes the route can be determined. If one or more of the unit dispensing devices can be reached within given time limits for the one or more unit dispensing devices, then follow this determined route. If not, the following can be performed. First, find the unit dispensing device with the strictest time limit and find the route to that unit dispensing device from the current location to that vehicle. Next, find all the unit dispensing devices that can be fulfilled along the way to that new route while maintaining the time constraint for the unit dispensing device with the strictest time limit. Next, update the time and unit limit for one or more unit dispensing device as well as the units in store for the vehicle. If the vehicle is likely to run out of units or might not fulfill any of the requirements, no solution exists, and an external source (e.g., an administrator) can be notified and/or another vehicle can be routed to the unit dispensing device. Alternatively, if there is no solution for one or more unit dispensing devices, take those unit dispensing devices out of the problem domain and solve for other unit dispensing devices in the domain.

In another example of a non-optimal TSP based problem for multiple vehicle routing, a greedy water-fall method can be utilized for the solution. In this case, the solution interval can be partitioned in time intervals and the solution can be computed and updated for one or more intervals. For one or more time intervals, the unit dispensing devices can be sorted based on their time limits. The solution domain can be partitioned into multiple sets of unit dispensing devices. Respective sets can have m number of unit dispensing devices, where m is the number of vehicles operating at any time interval. The first set has the m unit dispensing devices with the strictest time limits, the second set has the next m in the sorted list and so on and so forth. One or more of these sets can be then distributed to the m operating vehicles based on their proximity to the unit dispensing devices. One or more unit dispensing device then solves the problem as the single vehicle routing problem as described above.

Figure 6:
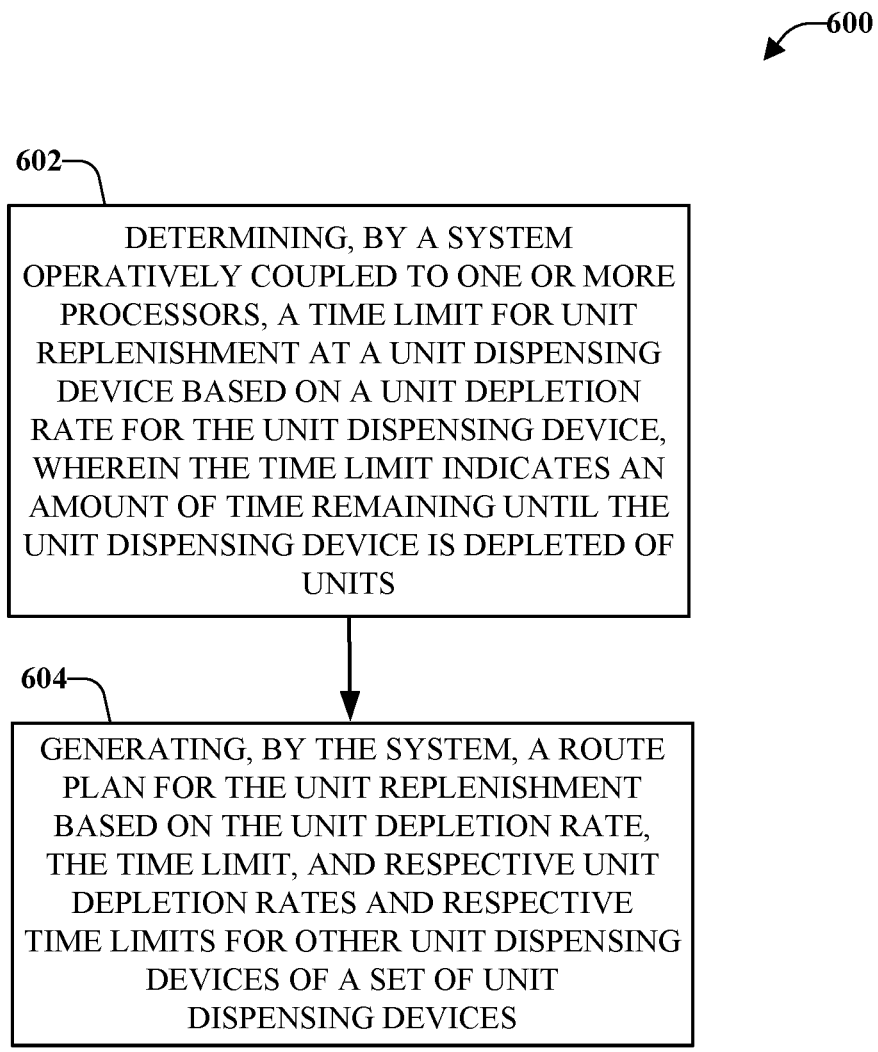
FIG. 6 illustrates a flow diagram of an example, non-limiting computer-implemented method that facilitates cognitive route planning in accordance with one or more embodiments described herein.

FIG. 6 illustrates a flow diagram of an example, non-limiting computer-implemented method 600 that facilitates cognitive route planning in accordance with one or more embodiments described herein. At 602, a system operatively coupled to one or more processors, can determine a time limit for unit replenishment at a unit dispensing device (e.g., via the timing component 202). The time limit can be determined based on a unit depletion rate for the unit dispensing device. Further, the time limit can indicate an amount of time remaining until the unit dispensing device is depleted of units. The unit depletion rate can be based on historical withdrawal data and projected withdrawal data. The unit dispensing device can be included in a set of unit dispensing devices located within a defined area.

At 604, the system can generate a route plan for the unit replenishment (e.g., via the scheduling component 204). The route plan can be based on the unit depletion rate, the time limit, and respective unit depletion rates and respective time limits for other unit dispensing devices of the set of unit dispensing devices. For example, the route plan generated can account for the time limits for all the unit dispensing devices in the defined area. Based on the time limits and a time to travel to one or more of the unit dispensing devices, the route plan can be determined.

According to some implementations, generating the route plan can include determining a route of a vehicle from a source of units to the unit dispensing device and the other unit dispensing devices in an order selected based on the time limit and the respective time limits. Alternatively or additionally, generating the route plan can include determining a first route for a first vehicle and a second route for a second vehicle. The first route and the second route can originate at a source of the units and can be determined based on the time limit and the respective time limits.

In some implementations, generating the route plan can comprise determining the time limit based on a determination of another amount of time remaining before a quantity of units within the unit dispensing device reaches a defined unit level. According to another implementation, generating the route plan can comprise increasing a processing speed of the unit replenishment at the set of unit dispensing devices (e.g., the unit dispensing devices can be replenished prior to being fully depleted of units).

In accordance with some implementations, the method 600 can include receiving, by the system, data indicative of respective patterns of unit withdraws from the unit dispensing device and associated with one or more entities. The historical withdrawal data can comprise data indicative of the respective patterns of unit withdraws.

Figure 7:
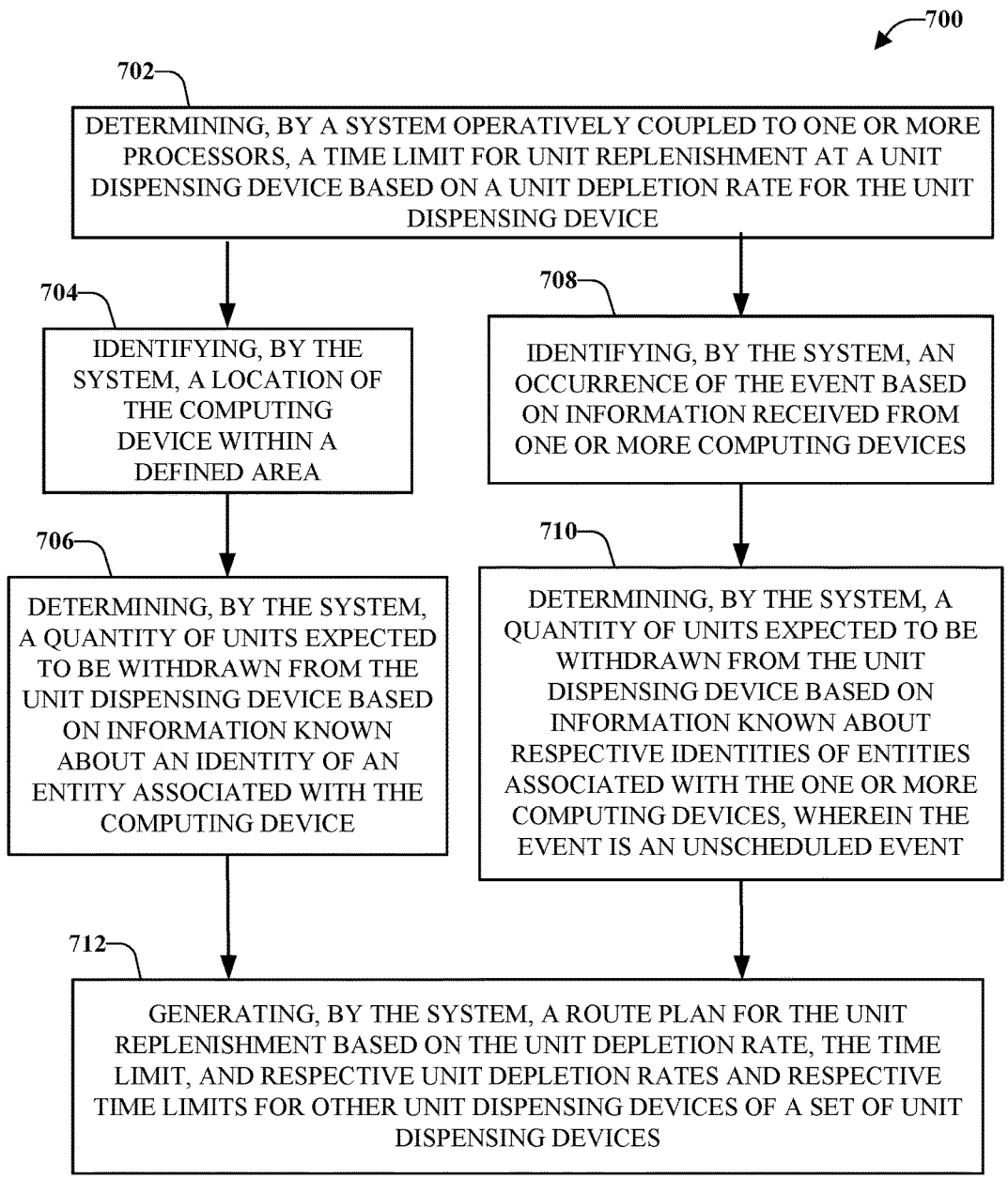
FIG. 7 illustrates a flow diagram of an example, non-limiting computer-implemented method that facilitates cognitive route planning for replacement of units in accordance with one or more embodiments described herein.

FIG. 7 illustrates a flow diagram of an example, non-limiting computer-implemented method 700 that facilitates cognitive route planning for replacement of units based on searches for unit dispensing devices or based on an unplanned event in accordance with one or more embodiments described herein. At 702, determine, by a system operatively coupled to one or more processors, a time limit for unit replenishment at a unit dispensing device based on a unit depletion rate for the unit dispensing device (e.g., via the timing component 202). The unit dispensing device can be included in a set of unit dispensing devices located within a defined area. The unit depletion rate can be based on historical withdrawal data and projected withdrawal data. Further, the time limit can indicate an amount of time remaining until the unit dispensing device is depleted of units.

According to an implementation, the projected withdrawal data can comprise data associated with a related activity that can indicate an impact on the unit depletion rate. The related activity can be a search for unit dispensing devices within an electronic mapping application installed on a computing device and, for this situation, the method 700 continues at 704, and the unit depletion rate can be determined based on identifying a location of a computing device located within a defined area (e.g., via the location component 302). For example, the location of the computing device can be determined based on information received from the device (e.g., a global positioning system or another location determination) or based on information obtained about the device, such as based on data obtained from other devices. At 706, a quantity of units expected to be withdrawn from the unit dispensing device can be determined based on information known about an identity of an entity associated with the computing device (e.g., via the assessment component 304).

In an alternative or additional implementation, the projected withdrawal data can comprise data associated with a related activity that can indicate an impact on the unit depletion rate. The related activity can be an event occurring within or near the defined area. In this situation, the unit depletion rate can be determined based on, at 708, identifying an occurrence of the event based on information received from one or more computing devices within or near the defined area (e.g., via the activity component 306). Further, at 710, the method 700 can include determining a quantity of units expected to be withdrawn from the unit dispensing device based on information known about respective identities of entities associated with the one or more computing devices (e.g., via the assessment component 304). Further to this implementation, the event can be an unscheduled event.

At 712, the method 700 can include generating, by the system, a route plan for the unit replenishment. The route plan can be based on the unit depletion rate, the time limit, and respective unit depletion rates and respective time limits for other unit dispensing devices of the set of unit dispensing devices.

Figure 8:
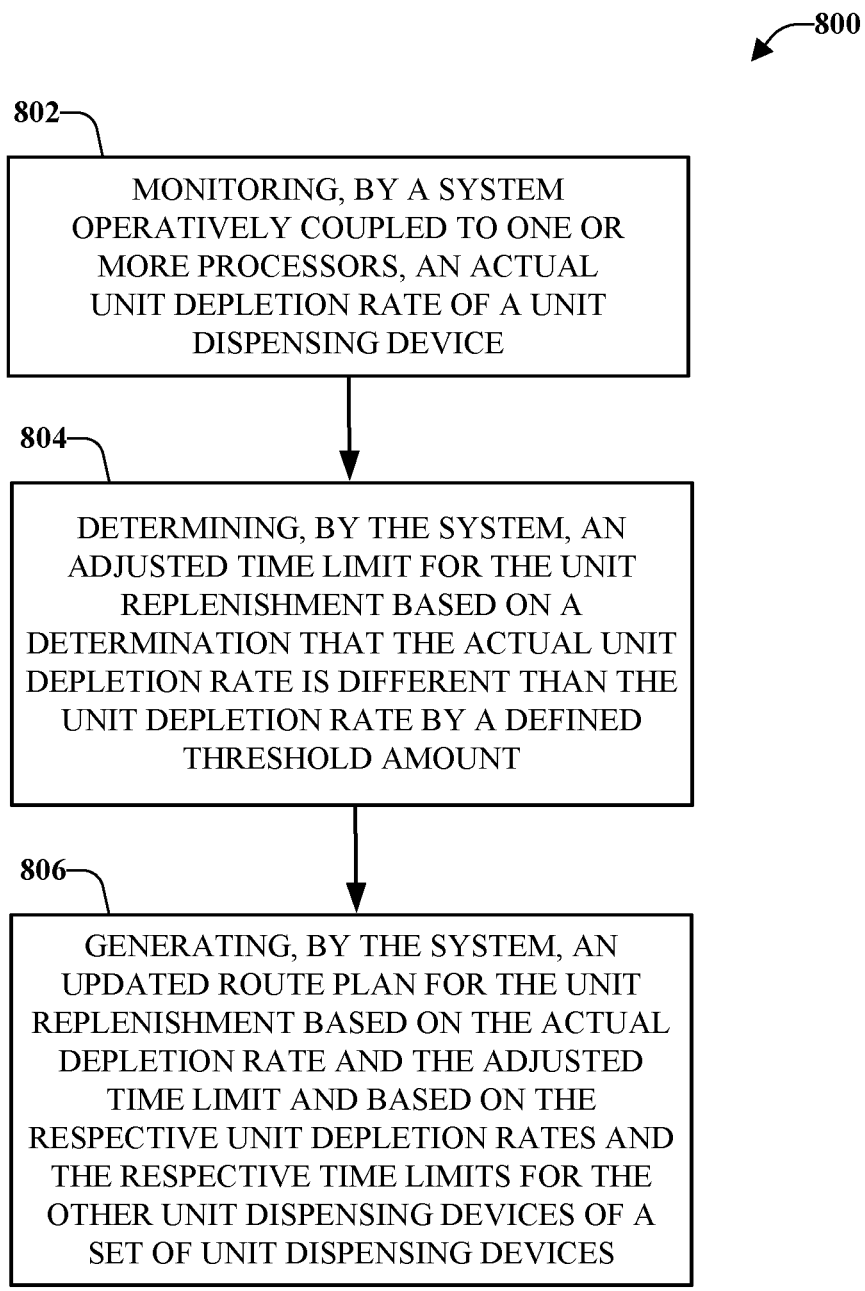
FIG. 8 illustrates a flow diagram of an example, non-limiting computer-implemented method that facilitates a feedback loop for continual learning related to cognitive route planning in accordance with one or more embodiments described herein.

FIG. 8 illustrates a flow diagram of an example, non-limiting computer-implemented method 800 that facilitates a feedback loop for continual learning related to cognitive route planning in accordance with one or more embodiments described herein. An initial route can be determined using, for example, method 600 of FIG. 6 and/or method 700 of FIG. 7. As the route is being traversed by one or more unit replenishment vehicles, the method 800 can include, at 802, monitoring, by a system operatively coupled to one or more processors, an actual unit depletion rate of the unit dispensing device (e.g., via the communication component 402). For example, one or more unit dispensing devices can convey information related to a current status of the respective unit dispensing device. In a specific example of automated teller machines, one or more automated teller machine can convey information related to cash withdrawals, including monetary denominations, deposits, and operating status (e.g., electronic failure, power outage, all systems operating correctly, and so on).

Based on the monitoring, the method 800 continues at 804 with determining, by the system, an adjusted time limit for the unit replenishment based on a determination that the actual unit depletion rate is different than the unit depletion rate by a defined amount (e.g., via the timing component 202). Slight variations can be acceptable, such as an entity withdraws z+3 units, when only withdrawal of z units was expected, where z is an integer. However, larger variations can indicate a problem with the estimation related to the number of units that might be withdrawn.

At 806, the method 800 can include generating, by the system, an updated route plan for the unit replenishment based on the actual depletion rate and the adjusted time limit and based on the respective unit depletion rates and the respective time limits for the other unit dispensing devices of the set of unit dispensing devices (e.g., via the scheduling component 204). According to some implementations, a determination can be made related to the reason for the discrepancy, and this information can be retained in a database and/or fed back to the route planning engine 102 (or another system component) to update or more current predictions, as well as adjust future predications based on the new information (e.g., through a feedback loop). According to some implementations, generating the updated route plan can include dispatching a unit replenishment vehicle to the unit dispensing device. The unit replenishment vehicle can be associated with another defined area.

In an example, the determination, at 804, can be a determination of an expedited time limit for the unit replenishment at the unit dispensing device based on an expedited unit depletion rate for the unit dispensing device. For example, the expedited unit depletion rate can be based on a determination that unit withdrawals from the unit dispensing device are more than expected (e.g., a larger number of withdrawals, a larger quantity of withdrawals being made, and so on.). Further to this example, the route generated at 806 can be an updated route plan for the unit replenishment based on the expedited unit depletion rate, the expedited time limit, and the respective unit depletion rates and the respective time limits for other dispensing devices of the set of unit dispensing devices.

Figure 9:
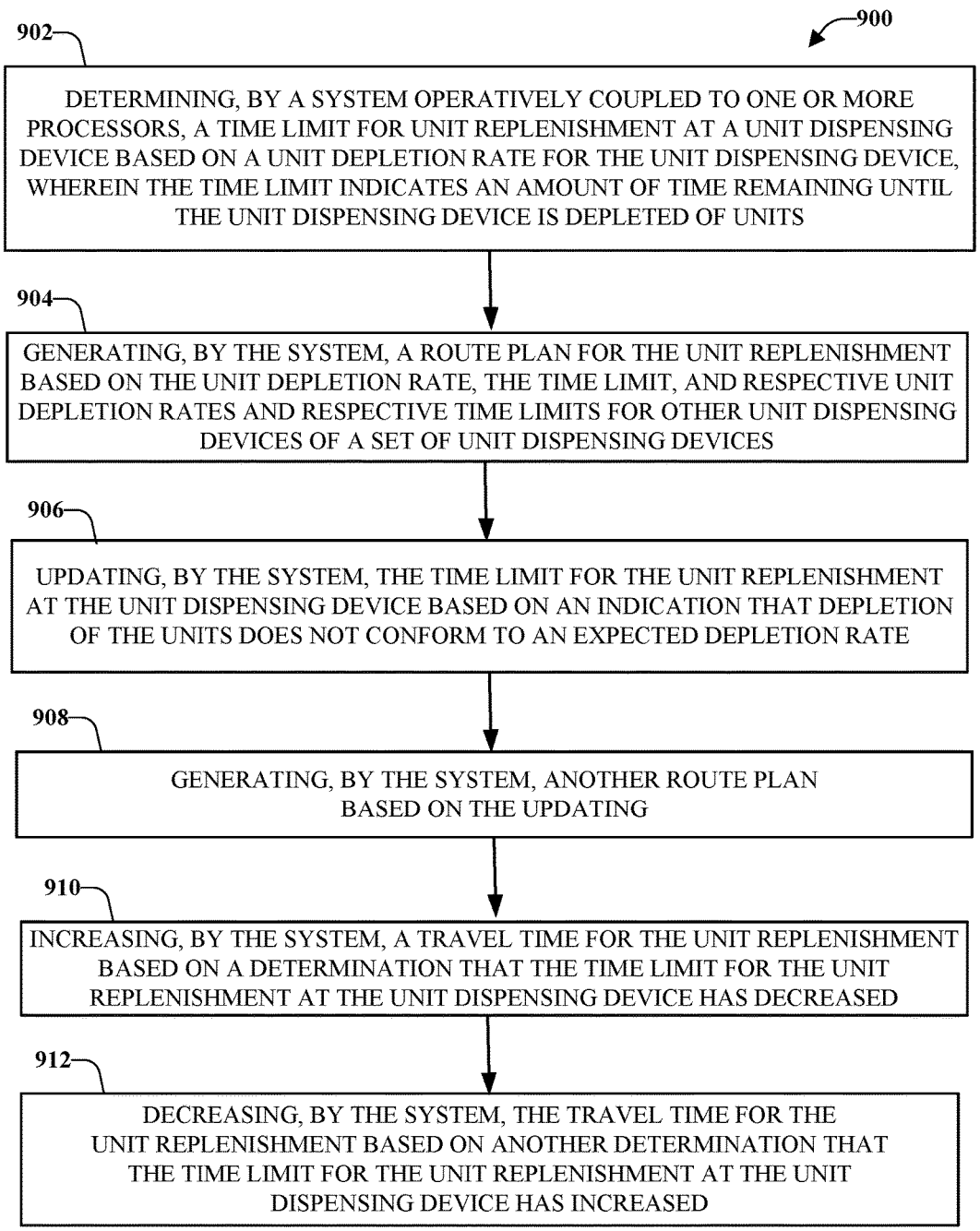
FIG. 9 illustrates a flow diagram of an example, non-limiting computer-implemented method that facilitates automatic adjustments to cognitive route planning in accordance with one or more embodiments described herein.

FIG. 9 illustrates a flow diagram of an example, non-limiting computer-implemented method 900 that facilitates automatic adjustments to cognitive route planning in accordance with one or more embodiments described herein. The method starts, at 902, with determining, by a system operatively coupled to one or more processors, a time limit for unit replenishment at a unit dispensing device based on a unit depletion rate for the unit dispensing device (e.g., via a timing component 202). The unit depletion rate can be based on historical withdrawal data and projected withdrawal data. The unit dispensing device can be included in a set of unit dispensing devices located within a defined area. Further, the time limit can indicate an amount of time remaining until the unit dispensing device is depleted of units. At 904, the method 900 can include generating, by the system, a route plan for the unit replenishment based on the unit depletion rate, the time limit, and respective unit depletion rates and respective time limits for other unit dispensing devices of the set of unit dispensing devices (e.g., via the scheduling component 204).

At 906, the time limit for the unit replenishment at the unit dispensing device can be updated based on an indication that depletion of the units does not conform to an expected depletion rate (e.g., via the timing component 202). For example, one or more unit dispensing device can transmit information related to respective units available at the one or more unit dispensing devices and the information can be processed and compared to predicted information and the time limit recalculation.

Based on the updated time limit, at 908, another route plan can generated (e.g., via the scheduling component 204). For example, at 910, a travel time for the unit replenishment can be increased based on a determination that the time limit for the unit replenishment at the unit dispensing device has decreased (e.g., via the scheduling component 204). In an example, a unit depletion at a unit dispensing device is quicker than expected and, therefore, the time limit until all units available at the unit dispensing device is depleted has decreased (e.g., instead of 2:00 p.m., the unit will be depleted at 11:00 a.m., resulting in a decrease of three hours). Accordingly, the route plan can be changed to replenish this unit dispensing device quicker than originally scheduled, which can include dispatching a second vehicle.

In another example, at 912, the travel time for the unit replenishment can be decreased based on another determination that the time limit for the unit replenishment at the unit dispensing device has increased (e.g., via the scheduling component 204). In this case, the units are not being withdrawn as quickly as predicted and/or not as many units are being withdrawn as expected. Therefore, replenishment of one or more unit dispensing devices can be rescheduled ahead of the unit dispensing device that is experiencing slower than expected unit withdrawal.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
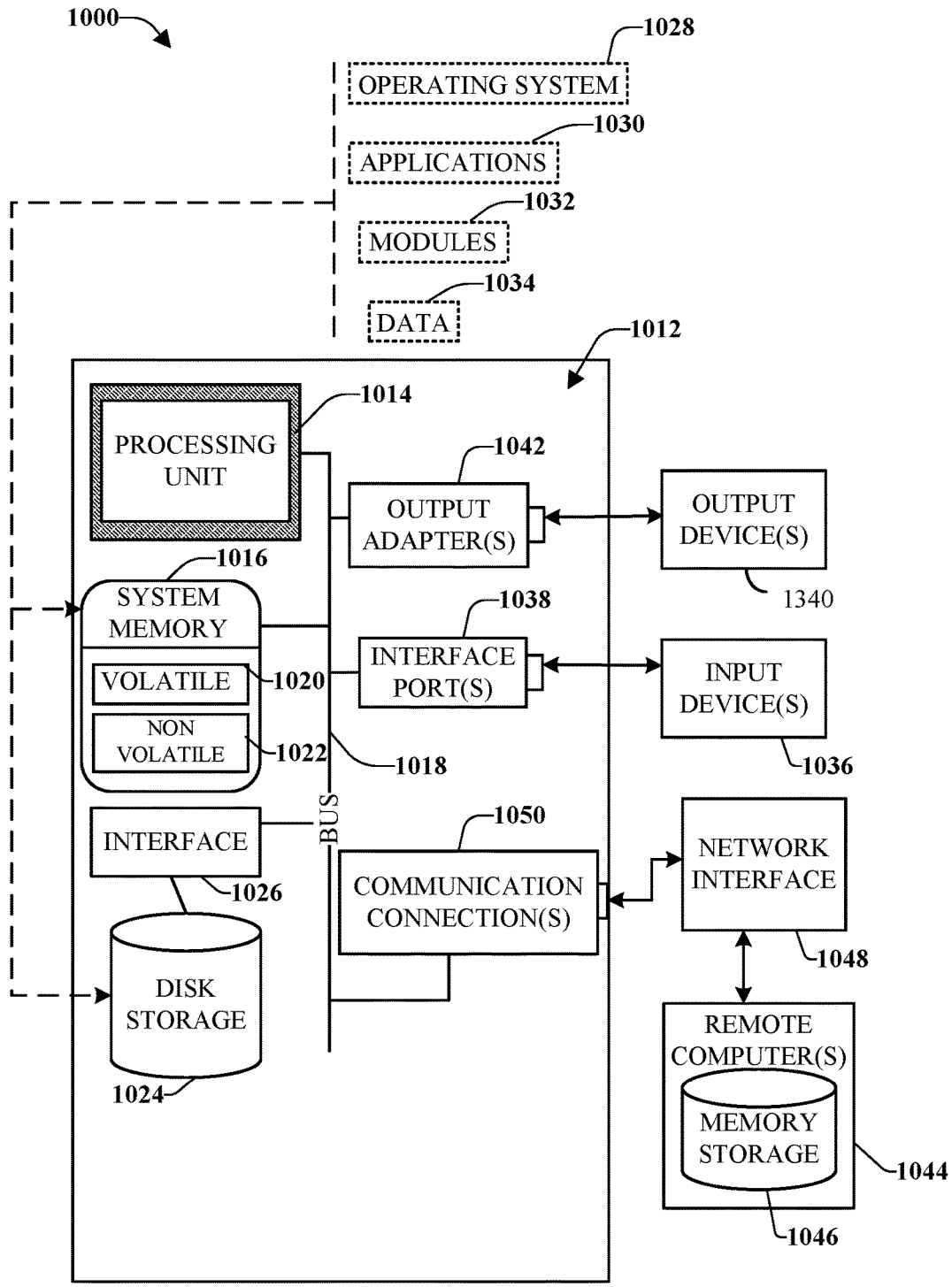
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
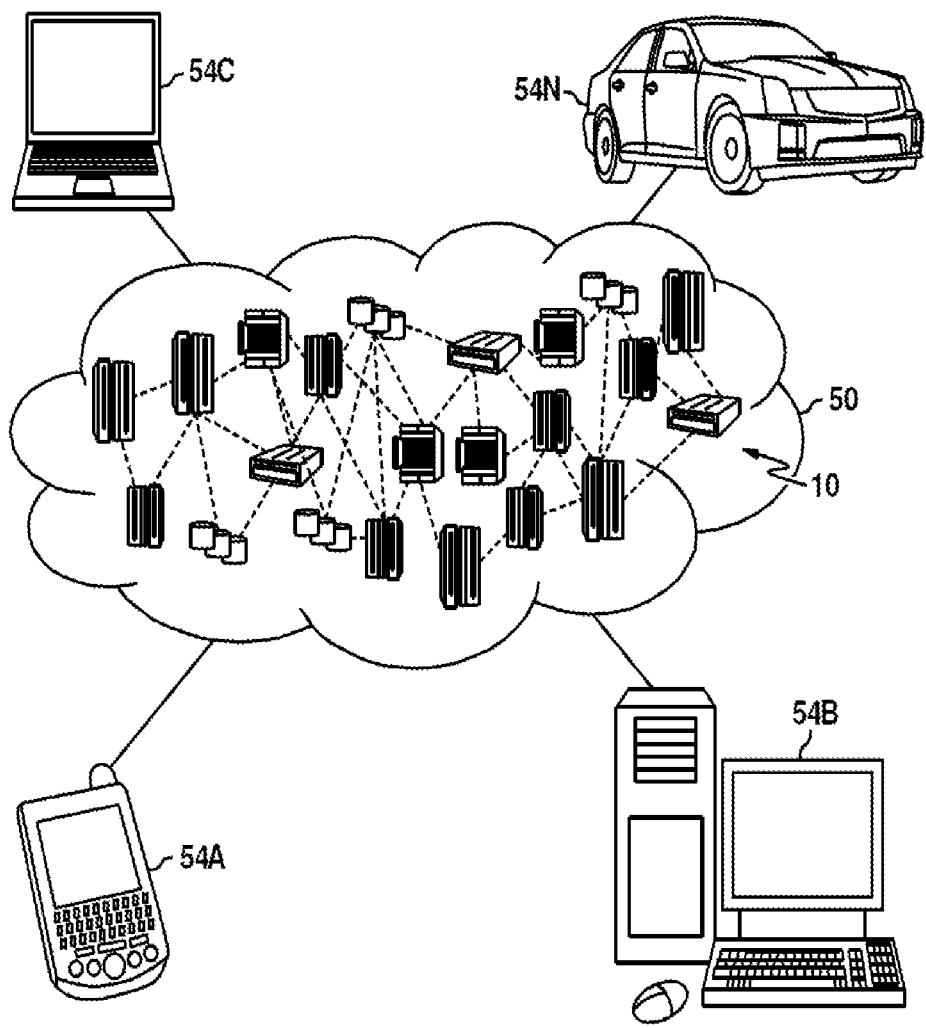
FIG. 11 depicts a cloud computing environment in accordance with one or more embodiments described herein.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
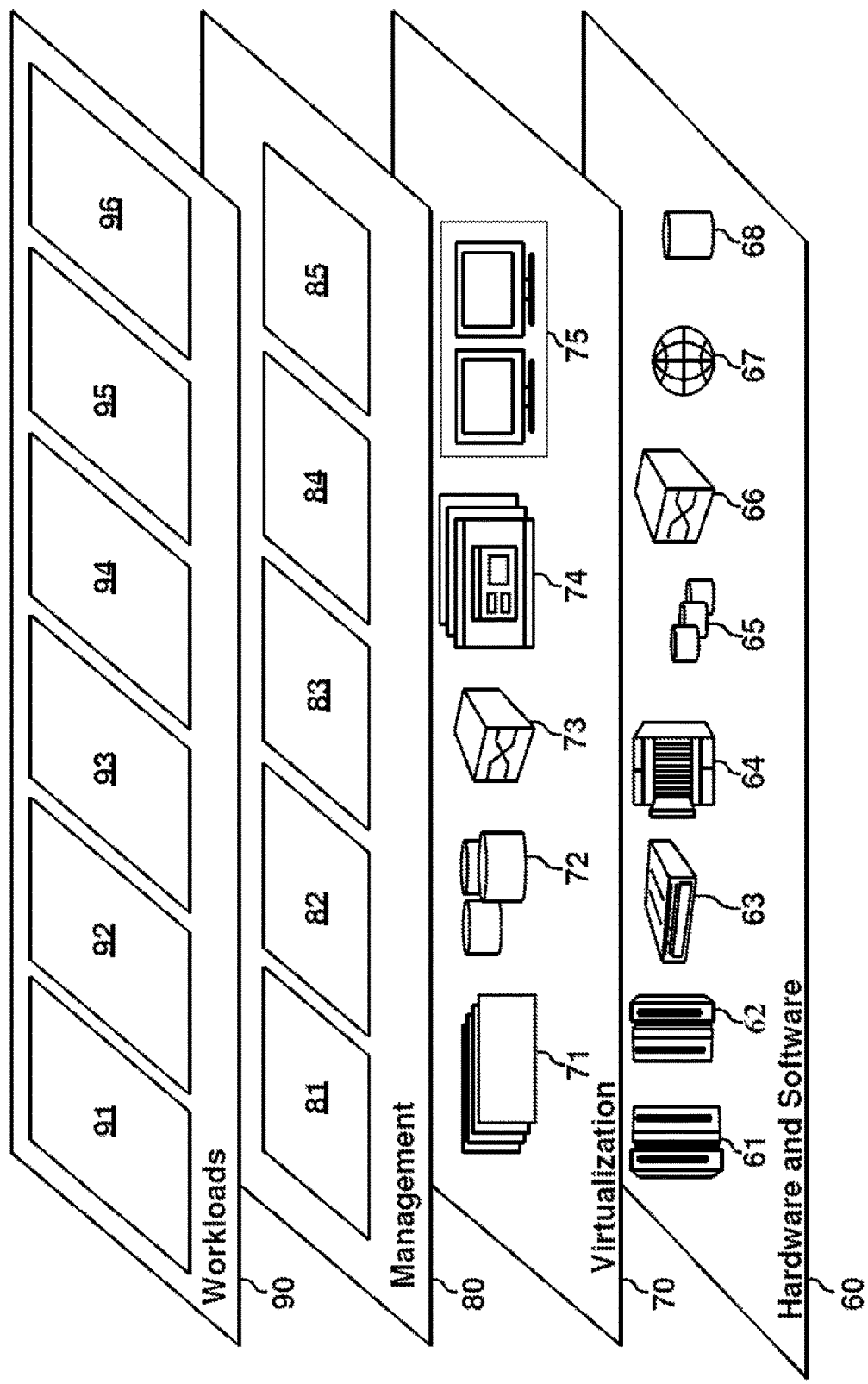
FIG. 12 depicts abstraction model layers in accordance with one or more embodiments described herein.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided: Hardware and software layer 60 includes hardware and software components. Examples of hardware components include:

mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, the procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimating node processing capacity values for order fulfillment 96.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining, by a system operatively coupled to one or more processors, a time limit for unit replenishment at a unit dispensing device based on a unit depletion rate for the unit dispensing device, wherein the time limit indicates an amount of time remaining until the unit dispensing device is depleted of units;
    generating, by the system, a route plan for the unit replenishment based on the unit depletion rate, the time limit, and respective unit depletion rates and respective time limits for other unit dispensing devices of a set of unit dispensing devices;
    updating, by the system, the time limit for the unit replenishment at the unit dispensing device based on an indication that depletion of the units does not conform to the unit depletion rate;
    generating, by the system, a second route plan based at least on the updating, the generating the second route plan comprising:
        increasing a travel time for the unit replenishment based on a determination that the time limit for the unit replenishment at the unit dispensing device has decreased, or
        decreasing the travel time for the unit replenishment based on a second determination that the time limit for the unit replenishment at the unit dispensing device has increased; and
    dispatching, by the system, at least one unit replenishment vehicle according to the second route plan.

2. The computer-implemented method of claim 1, wherein the unit depletion rate is based on projected withdrawal data that comprises data associated with a related activity that indicates an impact on the unit depletion rate, the related activity is a search for unit dispensing devices within an electronic mapping application installed on a computing device, and wherein the unit depletion rate is determined based on:
    identifying a location of the computing device within a defined area; and
    determining a quantity of units expected to be withdrawn from the unit dispensing device based on information known about an identity of an entity associated with the computing device.

3. The computer-implemented method of claim 1, wherein the unit depletion rate is based on projected withdrawal data that comprises data associated with a related activity that indicates an impact on the unit depletion rate, the related activity is an event, and wherein the unit depletion rate is determined based on:
    identifying an occurrence of the event based on information received from one or more computing devices; and
    determining a quantity of units expected to be withdrawn from the unit dispensing device based on information known about respective identities of entities associated with the one or more computing devices, wherein the event is an unscheduled event.

4. The computer-implemented method of claim 1, wherein the generating the route plan comprises:
    determining a route from a source of units to the unit dispensing device and the other unit dispensing devices in an order selected based on the time limit and the respective time limits.

5. The computer-implemented method of claim 1, wherein the generating the route plan comprises:
    determining a first route for a first unit replenishment vehicle of the at least one unit replenishment vehicle and a second route for a second unit replenishment vehicle of the at least one unit replenishment vehicle, wherein the first route and the second route originate at a source of the units and are determined based on the time limit and the respective time limits.

6. The computer-implemented method of claim 1, further comprising:
    monitoring, by the system, an actual unit depletion rate of the unit dispensing device;
    generating, by the system, the second route plan for the unit replenishment based further on the actual unit depletion rate.

7. The computer-implemented method of claim 1, further comprising:
    determining, by the system, an expedited time limit for the unit replenishment at the unit dispensing device based on an expedited unit depletion rate for the unit dispensing device, the expedited unit depletion rate is based on a determination that unit withdrawals from the unit dispensing device are more than expected; and
    generating, by the system, an updated route plan for the unit replenishment based on the expedited unit depletion rate, the expedited time limit, and the respective unit depletion rates and the respective time limits for other dispensing devices of the set of unit dispensing devices.

8. The computer-implemented method of claim 7, modifying the dispatching of the unit replenishment vehicle based on the updated route plan.

9. The computer-implemented method of claim 1, wherein the generating the route plan comprises determining the time limit based on a determination of a second amount of time remaining before a quantity of units within the unit dispensing device reaches a defined unit level.

10. The computer-implemented method of claim 1, wherein the unit depletion rate is based on historical withdrawal data and projected withdrawal data, the computer-implemented method further comprising receiving, by the system, data indicative of respective patterns of unit withdraws from the unit dispensing device and associated with one or more entities, wherein the historical withdrawal data comprises data indicative of the respective patterns of unit withdraws.

11. The computer-implemented method of claim 1, wherein the generating the route plan comprises increasing a processing speed of the unit replenishment at the set of unit dispensing devices.

12. A system, comprising:
   a memory that stores computer executable components; and
   a processor that executes the computer executable components stored in the memory, wherein the computer executable components comprise:
      a timing component that determines a time limit for unit replenishment at a unit dispensing device based on a unit depletion rate for the unit dispensing device, wherein the time limit indicates an amount of time remaining until the unit dispensing device is depleted of units; and
      a scheduling component that generates a route plan for the unit replenishment based on the unit depletion rate, the time limit, and respective unit depletion rates and respective time limits for other unit dispensing devices of a set of unit dispensing devices;
      wherein the timing component updates the time limit for the unit replenishment at the unit dispensing device based on an indication that depletion of the units does not conform to the unit depletion rate; and
      wherein the scheduling component generates a second route plan based on the update to the time limit, the generation of the second route plan comprising:
         increase a travel time for the unit replenishment based on a determination that the time limit for the unit replenishment at the unit dispensing device has decreased, or
         decrease the travel time for the unit replenishment based on a second determination that the time limit for the unit replenishment at the unit dispensing device has increased; and
         dispatches at least one unit replenishment vehicle according to the second route plan.

13. The system of claim 12, wherein the scheduling component schedules the unit replenishment before a second unit replenishment of a second unit dispensing device of the set of unit dispensing devices based on a determination that the unit depletion rate is shorter than a second unit depletion rate of the second unit dispensing device.

14. The system of claim 12, wherein the respective projected withdrawal data comprises data associated with a related activity that indicates a potential impact on the unit depletion rate, and wherein the related activity is a search for unit dispensing devices within an electronic mapping application installed on a computing device, the computer executable components further comprise:
   a location component that determines a location of the computing device; and
   an assessment component that determines a quantity of units expected to be withdrawn from the unit dispensing device based on information known about an identity of an entity associated with the computing device.

15. The system of claim 12, wherein the respective projected withdrawal data comprises data associated with a related activity that indicates an impact on the unit depletion rate, and wherein the related activity is an event, the computer executable components further comprise:
   an activity component that identifies an occurrence of the event based on data received from one or more computing devices; and
   an assessment component that determines a quantity of units expected to be withdrawn from the unit dispensing device based on information known about respective identities of entities of the one or more computing devices, wherein the event is an unscheduled event.

16. A computer program product for facilitating cognitive route planning in a distributed network, the computer program product comprising a computer readable storage medium having program instructions embodied therewith, the program instructions executable by a processing component to cause the processing component to:
   determine a time constraint for unit replenishment at a unit dispensing device based on a unit depletion rate for the unit dispensing device, wherein the time constraint indicates an amount of time remaining until a quantity of units in the unit dispensing device satisfies a defined unit level;
   determine a route plan that comprises the unit dispensing device and other unit dispensing devices in a set of unit dispensing devices, the route plan is based on the unit depletion rate, the time constraint, and respective unit depletion rates and respective time constraints for the other unit dispensing devices;
   update the time constraint for the unit replenishment at the unit dispensing device based on an indication that depletion of the units does not conform to the unit depletion rate; and
   generate a second route plan based on the updating, the generating the second route plan comprising:
      increase a travel time for the unit replenishment based on a determination that the time constraint for the unit replenishment at the unit dispensing device has decreased, or
      decrease the travel time for the unit replenishment based on a second determination that the time constraint for the unit replenishment at the unit dispensing device has increased; and
   dispatch at least one unit replenishment vehicle according to the second route plan.

17. The computer program product of claim 16, wherein the program instructions executable by the processing component further cause the processing component to:
   determine a location of a computing device, wherein the unit depletion rate is based on projected withdrawal data the comprises data associated with a related activity that indicates an impact on the unit depletion rate, the related activity is a search for unit dispensing devices by an application executing on the computing device; and
   determine the quantity of units expected to be withdrawn from the unit dispensing device based on information known about an identity of an entity associated with the computing device, wherein the projected withdrawal data comprises the quantity of units expected to be withdrawn.

18. The computer program product of claim 16, wherein the program instructions executable by the processing component further cause the processing component to:
  identify an occurrence of an event based on data received from one or more computing devices, wherein the unit depletion rate is based on projected withdrawal data that comprises data associated with a related activity that indicates an impact on the unit depletion rates, the related activity is an unscheduled event; and
  determine a number of units expected to be withdrawn from the unit dispensing device based on information known about respective identities of entities associated with the one or more computing devices.

19. The computer program product of claim 16, wherein the unit depletion rate and the respective unit depletion rates are variable rates.

* * * * *